United States Patent Office 3,511,865
Patented May 12, 1970

3,511,865
PROCESS FOR PREPARING TRIALKYLSILYL-
METHYLALKALI-METAL COMPOUNDS
Donald J. Peterson, Cincinnati, Ohio, assignor to The
Procter & Gamble Company, Cincinnati, Ohio, a corporation of Ohio
No Drawing. Filed Nov. 28, 1967, Ser. No. 686,291
Int. Cl. C07f 7/18
U.S. Cl. 260—448.2         3 Claims

ABSTRACT OF THE DISCLOSURE (1) Trialkylsilylmethylmetal compounds prepared by reacting the trialkylmethylsilane with a strongly reactive metalating agent, e.g., a complex between alkyllithium compounds and alkylenediamines; alkylsodium; or alkylpotassium; and (2) the reactions of trialkylsilylmethylmetal compounds with organic halides, aldehydes, ketones, carbon dioxide, halogenated and pseudo-halo phosphines, phosphites, epoxides, sulfur, and halogenated and pseudo-halo substituted silanes.

BACKGROUND OF THE INVENTION

This invention relates in part to trialkylmethylsilyl derivatives. Specifically, this invention relates to trialkylsilylmethylmetal compounds useful in the synthesis of carbon substituted organosilicon compounds. This invention also relates to a method of synthesizing trialkylsilylmethylmetal compounds and processes utilizing such compounds.

Heretofore the trialkylmethylsilanes have been relatively unreactive materials. This method of synthesis provides a route whereby the reactivity of the silanes can be increased by converting them to more highly reactive intermediates to obtain known organosilicon compounds heretofore difficult to synthesize.

The silylmethylene group, $R_3SiCH$—, where R is an organic radical, is a useful and valuable component to have in an organic compound imparting properties to that compound not possessed by the analogous carbon compound. For example, the presence of a silicon atom in an organic compound can provide greater stability to that compound at high temperatures not possessed by its solely organic counterpart.

Previously the only known route to incorporation of the silylmethylene group into various organic compounds was via a halogenation of the silylmethyl group and subsequent reaction of this halogenated product with a metal such as lithium according to the following reaction

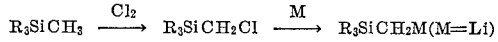

Both steps of the above reaction scheme can be difficult to accomplish. For example, monochlorination of the methylsilanes is always accompanied by some polychlorination. In addition the reaction of the chloromethylsilanes with lithium gives erratic yields of the desired products. Thus, up until the present invention, the reaction for production of trialkylsilylmethylmetal compounds was difficult to accomplish, expensive to use, yields were low and the synthesis was a two-step process.

SUMMARY

This invention relates primarily to the discovery that trialkylsilylmethylmetal compounds can be prepared by reacting a trialkylmethylsilane compound having the following general formula:

$$(R^1R^2R^3)SiCH_3$$

Where $R^1$, $R^2$ and $R^3$ are each saturated alkyl groups containing from 1 to about 20 carbon atoms, with a metalating agent which is an alkylsodium, alkylpotassium or a complex of an alkyllithium and a diamine compound (as hereinafter defined) said reaction taking place in an inert atmosphere at a temperature of from about —60° C. to about 100° C. in a solvent which is either an excess of the trialkylmethylsilane or a saturated hydrocarbon having from about 5 to about 16 carbon atoms.

It was found that the trialkylmethylsilanes were sufficiently reactive for metalation whereas silanes containing no methyl group would not undergo the metalation reaction. Thus the highly reactive silylmethylmetal compounds provided by the process of this invention have the following general formula:

$$(R^1R^2R^3)SiCH_2M$$

wherein $R^1$, $R^2$, and $R^3$ are as hereinbefore defined, and wherein M is an alkali metal, such as lithium, sodium or potassium.

The trialkylmethylsilane

Suitable $R^1$, $R^2$ and $R^3$ groups on the trialkylmethylsilane include straight chain, branched chain and cyclic saturated alkyl groups containing from 1 to about 20 carbon atoms (e.g., methyl, ethyl, n-propyl, isopropyl, n-butyl, 2-methylpropyl, n-pentyl, 2-methylbutyl, isopentyl, n-hexyl, 2-methylpentyl, 2,3-dimethylbutyl, 2,2-dimethylbutyl, n-heptyl, 2,2-dimethylpentyl, n-octyl 2,2-dimethylhexyl, isooctyl, 2-ethylhexyl, n-nonyl, n-decyl, tripropylene, n-undecyl, n-dodecyl, tetrapropylene, n-tridecyl, n-tetradecyl, n-pentadecyl, n-hexadecyl, n-octadecyl, eicocyl, cyclopentyl, cyclohexyl, cyclooctyl, methylcyclohexyl, 2-cyclohexyldodecyl, 12-cyclohexyldodecyl, and dodecylcyclohexyl. The preferred alkyl group is methyl and the preferred trialkylmethylsilane is tetramethylsilane. Tetramethylsilane undergoes the aforesaid reaction readily and tetramethylsilane is commercially available.

A stoichiometric amount or an excess of the trialkylmethylsilane in relation to the metalating agent is preferably employed to prevent excess metalating agent from interfering with subsequent reactions of the trialkylsilylmethylmetal compounds. If excess metalating agent is present it is readily reactive and competes in the subsequent reactions or utilization of the trialkylsilylmethylmetal. The trialkylmethylsilane can even be used as the reaction medium in ratios as high as 4 to 1 with respect to the metalating agent.

Metalating agents

The alkyllithiums are preferably selected so that the point of attachment of the lithium is to a primary carbon atom. Alkyllithiums in which the attachment is at a secondary carbon atom can be used, however, they are less effective than those in which the lithium is attached through a primary carbon atom. Alkyllithiums in which the point of attachment is a tertiary carbon atom, e.g., t-butyllithium, are not effective.

Suitable alkyllithiums for use in forming the metalating complex include those wherein the alkyl groups are straight chain, branched chain and cyclic containing from 1 to about 20 carbon atoms, e.g., methyl, ethyl, propyl, n-butyl, 3-methylbutyl; isopropyl, n-pentyl, isopentyl, n-hexyl, n-heptyl, n-octyl, n-decyl, tetrapropylene, 4-propyl-undecyl, n-hexadecyl, n-dodecyl, eicosyl, cyclohexyl, cyclopentyl and methylcyclohexyl.

The alkylsodiums and alkylpotassiums as metalating agents are those wherein the alkyl groups are straight chain or branched chain groups containing from 1 to about 20 carbon atoms and that have the metal atom attached to a primary carbon atom, since the corresponding secondary or tertiary organometallic sodiums and potassiums are difficult, if not impossible, to prepare.

Suitable alkylsodiums and alkylpotassiums are methyl, ethyl, propyl, butyl, 3-methylbutyl, isopropyl, n-pentyl, isopentyl, n-hexyl, n-heptyl, n-octyl, n-decyl, tetrapropylene, 4-propyldecyl, n-hexadecyl, n-dodecyl, and eicosyl.

Although it is possible to metalate using alkyllithiums alone, the metalation proceeds very slowly. The reactivity of alkyllithium is increased considerably by complexation with the diamine, hereinafter described, in contrast to the situation with alkyl sodiums and potassiums since their reactivity is such that complexation is unnecessary. The metalating complexation of organolithium complexes and diamines is described by G. G. Eberhardt and W. A. Butte, in J. Org. Chem., 29, 2928 (1964) and A. W. Langer, Jr. in Trans. N.Y. Acad. Sci., Ser. II, 27, 741 (1965). The diamine compound used in the complexation of the alkyllithium is shown as follows:

$$(R^4R^5)NR^6N(R^7R^8)$$

wherein $R^4$, $R^5$, $R^7$ and $R^8$ are saturated straight chain, branched chain or cyclic alkyl groups having from 1 to about 20 carbon atoms. $R^6$ in the above generic formula is a saturated alkylene straight chain group having from 1 to about 4 carbon atoms with the total carbon atoms in the said diamine compound being from about 5 to about 30 carbon atoms. Suitable $R^4$, $R^5$, $R^7$ and $R^8$ groups include methyl, ethyl, n-propyl, isopropyl, n-butyl, n-pentyl, isopentyl, n-hexyl, 2,2-dimethylpentyl, 2-methylpentyl, n-octyl, 2,2-dimethylhexyl, isooctyl, 2-ethylhexyl, n-nonyl, n-decyl, tripropylene, n-undecyl, n-dodecyl, tetrapropylene, n-tridecyl, ethyldodecyl, 2,5,9-trimethyltridecyl, n-tetradecyl, n-pentadecyl, n-hexadecyl, n-octadecyl, eicosyl, cyclopentyl, cyclohexyl, cyclooctyl, methylcyclohexyl, 2-cyclohexyldodecyl, 12-cyclohexyldodecyl and 4-dodecylcyclohexyl. The $R^4$, $R^5$, $R^7$ and $R^8$ alkyl groups may be the same or different. The preferred $R^4$, $R^5$, $R^7$ and $R^8$ groups are methyl and ethyl groups.

Suitable $R^6$ groups include methylene, ethylene, propylene and butylene groups. The preferred $R^6$ group is ethylene with methylene and propylene also being preferred. Diamines in which the ring size of the resulting complex with the alkyllithium involves 5, 6 or 7 atoms are very effective complexing agents.

Examples of suitable diamine complexing agents include N-methyl, N-ethyl, N'-propyl, N'-butylpropylenediamine, N-dodecyl, N,N',N'-trimethylmethylenediamine, N-octyl, N,N',N'-triethylbutylenediamine, N,N,N',N'-tetraethylpropylenediamine, and N-eicosyl, N,N',N'-trimethylethylenediamine.

The preferred diamine complexing agents are

N,N,N',N'-tetramethylethylenediamine,
N,N,N',N'-tetraethylethylenediamine,
N,N,N',N'-tetramethylpropylenediamine and
N,N,N',N'-tetraethylpropylenediamine.

The ratio of alkyllithium to the diamine for complexation can be from 1 to 1 to 4 to 1. The preferred ratio is 1 to 1.

The metalation reaction and other subsequent reactions must take place in an inert atmosphere, e.g., nitrogen, argon or helium since the organometallic compounds are highly reactive and they will be decomposed if exposed to a reactive atmosphere, such as air or moisture.

The temperature of the reaction can be any temperature at which the reaction mixture is liquid, i.e., above about −60° C. The temperature is usually less than about 100° C. since organometallic compounds tend to decompose above this temperature. The preferred temperature is about 20° C.

The metalating agents normally are sold commercially with an excess of liquid saturated hydrocarbons such as pentane, hexane, octane, cyclohexane, isooctane, nonane or decane, however, any saturated hydrocarbon having from 5 to 16 carbon atoms and being either straight chain, branched chain or cyclic may be used. The concentration of the metalating agent is usually about 1.5 molar and can range from 1 molar to 3 molar concentration. Saturated hydrocarbons are used as solvents because they will not undergo reaction with organometallic compounds. The preferred solvent is hexane because the boiling point is optimum, it is easily removed by distillation and it is liquid at room temperature. Other preferred solvents are pentane and heptane.

Reactions of trialkylsilylmethylmetal compounds reactions with organic halides

The trialkylsilylmethylmetal compounds of this invention will react with organic halides having the formula: $R^9X^1$, wherein $R^9$ is a saturated or unsaturated alkyl group or an aryl group containing from 1 to about 20 carbon atoms and wherein $X^1$ is a halogen atom selected from the group consisting of chlorine, bromine, and iodine.

The reaction of the trialkylsilylmethylmetal compound with an organic halide proceeds as follows:

$$R^9X^1 + (R^1R^2R^3)SiCH_2M \rightarrow (R^1R^2R^3)SiCH_2R^9 + MX^1$$

Suitable $R^9$ groups wherein the group is alkyl are: methyl, ethyl, propyl, isopropyl, n-butyl, 2-butenyl, n-pentyl, allyl, n-octyl, n-hexyl, n-heptyl, n-nonyl, n-dodecyl, tetrapropylene, n-tetradecyl, n-tridecyl, n-pentadecyl, n-hexadecyl, n-octadecyl and eicosyl, 2-dodecenyl, 2,4,6-dodecatrienyl, 3-dodecenyl, and 8-tetradecenyl. Suitable substituted alkyl chains as $R^9$ groups include: 3-methylbutyl, 4-ethylhexyl, 4-propylundecyl. $R^9$ groups may also be aryl or aralkyl groups such as phenyl, benzyl, naphthyl, 4-(2-naphthyl)butyl, and 4-naphthylbutyl. Alkyl or aralkyl hydrocarbon groups are preferred.

Preferably, the silanes resulting from this halide reaction contain from about 5 to about 25 carbon atoms. Specifically, when trimethylsilylmethylmetal, $$(CH_3)_3SiCH_2M$$

is reacted with undecyl bromide, $C_{11}H_{23}Br$, trimethyldodecylsilane, $(CH_3)_3SiC_{12}H_{25}$, is obtained according to the following:

$$(CH_3)_3SiCH_2M + C_{11}H_{23}Br \rightarrow (CH_3)_3SiC_{12}H_{25} + MBr$$

and the $C_{12}$ adduct obtained above as well as the $C_{10}$ to $C_{20}$ analogues are useful as high temperature lubricants as for example in jet engines.

The alkylation reactions must be carried out in an inert atmosphere and at a temperature of from about −60° C. to about 100° C. The conditions for this reaction are essentially the same as for the metalation reaction described hereinbefore. However, it is permissible to use more reactive solvents in this reaction, e.g., one can also use ethers containing from 4 to 14 carbon atoms such as diethyl ether, dibutyl ether, diphenyl ether, tetrahydrofuran, 1,2-dimethoxyethane and diethylene glycol dimethyl ether.

(Except where specifically stated all of the reactions of the trialkylsilylmethylmetal compounds of this invention, discussed hereinafter more fully, will take place under the same conditions as the previously described alkylation reaction with organic halides.)

Reactions with epoxides

The trialkylsilylmethylmetal compounds of this invention will react with epoxy compounds having the following general formula:

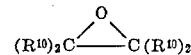

wherein each $R^{10}$ is either a hydrogen atom or a saturated or unsaturated alkyl, aryl, aralkyl, or alkaryl group containing from 1 to about 20 carbon atoms. The total number of carbon atoms in the epoxide compound should be less than about 40 carbon atoms and should preferably be less than about 30 carbon atoms. The product of this reaction is a compound having the formula

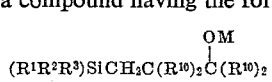

wherein $R^1$, $R^2$, $R^3$, $R^{10}$ and M have the definitions given hereinbefore. This compound will react with water to form the corresponding gamma-hydroxyalkyltrialkylsilane. In addition, the above compound will react with any compound reactive with the metal alkoxide such as an organic halide or pseudo-halide of the general formula, $R^{11}X^2$, where $R^{11}$ is an alkyl, aryl, alkaryl, or aralkyl group and $X^2$ is a halogen atom, such as chlorine, bromine or iodine, or a pseudo-halo group, such as RO—, $R_2N$—, or $RSO_4$—. In the above described reaction of trialkylsilylmethylmetal, with epoxy compounds, when decyldimethylsilylmethylmetal, $C_{10}H_{21}(CH_3)_2SiCH_2M$ is reacted with ethylene oxide,

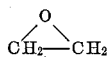

(3-hydroxypropyl)decyldimethylsilane, $$C_{10}H_{21}(CH_3)_2SiC_3H_6OH$$

is obtained according to the following

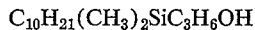
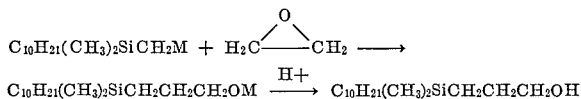

The above compound as well as compounds where $R^1$ ranges from 11 to 20 carbon atoms and where the sum of carbon atoms in the epoxide ranges from 2 to about 12 are useful as foam suppressors in an aqueous system, as for example to lower the sudsing of anionic surfactants in laundry detergent compositions.

$R^{10}$ in the above formulas is preferably an alkyl group containing from 1 to 20 carbon atoms (e.g., methyl, ethyl, n-propyl, isopropyl, n-pentyl, isopentyl, n-hexyl, 2,2-dimethylpentyl, n-heptyl, n-octyl, 2,2-dimethylhexyl, iso-octyl, 2-ethylhexyl, n-nonyl, n-decyl, tripropylene, n-undecyl, n-dodecyl, tetrapropylene, n-tridecyl, n-tetradecyl, n-pentadecyl, n-hexadecyl, n-octadecyl, eicosyl, cyclopentyl, cyclohexyl, cyclohexylmethyl, methylcyclohexyl, 2-cyclohexyldodecyl, 12-cyclohexyldodecyl, 4-dodecylcyclohexyl, and cyclooctyl groups). Preferably, three of the $R^{10}$ groups are hydrogen atoms. Terminal epoxy groups are more reactive, easier to obtain, and give cleaner reaction products.

Other suitable $R^{10}$ groups include aryl groups such as phenyl, biphenyl and naphthyl groups and substituted aryl groups such as tolyl, dodecylphenyl, 2-methyl-4-biphenyl, 4-methyl-1- naphthyl, 4-octyl-2-naphthyl, and 2,4-dimethylphenyl groups. Still other examples of suitable groups include aralkyl groups such as 3-phenyldodecyl, 4-phenyloctyl, 4-phenyldecyl, 4-phenylbutyl, p-tolylmethyl, 3-(2-naphthyl)propyl, 4-(1-naphthyl)butyl, 3-biphenylpentyl and 3-biphenylpropyl groups.

Other substituted $R^{10}$ groups include: 3-(p-tolyl)propyl; 4-phenylbutyl; 4-(1-naphthyl)hexyl; 3-(ethylnaphthyl) propyl; 3-(4-biphenyl)propyl; 3-(dimethylamino)-propyl; and 1,6-di(diethylamino)hexyl.

Hydrocarbon groups are preferred.

The above described alkoxide salt shown generically below as $$(R^1R^2R^3)SiC(R^{10})_2C(R^{10})_2OM$$

will react with conventional organic halides and pseudo-halides having the following formula $$R^{11}X^2$$

wherein $R^{11}$ is an alkyl, aralkyl or alkaryl group containing from 1 to about 20 carbon atoms and 1 to about 10 oxygen substituents replacing the methylene groups in alkyl and alkylene groups and 0 to about 5 substituent tertiary amino groups and wherein $X^2$ is a halogen atom such as chlorine, bromine or iodine or a pseudo-halide such as RO—, $R_2N$— or $RSO_4$—, etc. to give a compound of the following general formula:

$$(R^1R^2R^3)SiC(R^{10})_2C(R^{10})_2OR^{11}$$

The above class of compounds is useful as a hydraulic fluid in hydraulic systems where high temperatures are encountered.

$R^{11}$ is preferably an alkyl group, either saturated or unsaturated, containing from one to about 20 carbon atoms. Examples of these groups are: methyl, ethyl, n-propyl, 2,4-hexadienyl, 2,4-dodecadienyl, 2,7-tetradecadienyl, 2,4,6-dodecatrienyl, allyl, 3-dodecenyl, 8-tetradecenyl, 2-dodecynyl, isopropyl, butyl, 2-butenyl, n-hexyl, 3-methylhexyl, n-nonyl, tripropylene, n-octyl, n-decyl, n-undecyl, tetrapropylene, n-dodecyl, n-tridecyl, n-tetradecyl, 6-butyltetradecyl, n-pentadecyl, n-hexadecyl, n-octadecyl, eicosyl, and 2-octadecenyl groups.

$R^{11}$ can also be an aralkyl group such as benzyl, 12-phenyldodecyl, 1-naphthylmethyl, 2-biphenyl-2-ethyl, etc. Suitable substituted $R^{11}$ groups include 4-methoxybenzyl, 3,6,9,12 - tetraoxaoctadecyl and 3 - diethylaminopropyl groups.

Reaction with aldehydes

The trialkylsilylmethylmetal compounds of this invention react readily with aldehydes having the following formula:

$$R^{12}CHO$$

wherein $R^{12}$ is either a hydrogen atom or a saturated or unsaturated group which is either an alkyl, aryl, alkaryl or aralkyl group containing from one to about 20 carbon atoms. The reaction proceeds as follows:

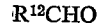
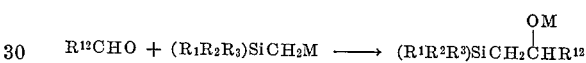

The resulting alkoxide salt can be reacted with water to give β-hydroxy silane compounds according to the following:

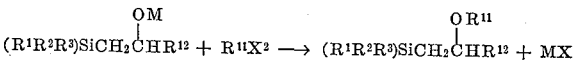

$R^{12}$ is preferably either a hydrogen atom or an alkyl group, either saturated or unsaturated, containing from 1 to about 20 carbon atoms. Examples of these groups are methyl, ethyl, propyl, allyl, isopropyl, n-butyl, 2-butenyl, n-hexyl, n-octyl, 2-ethyloctyl, n-nonyl, tripropylene, n-decyl, tetrapropylene, n-dodecyl, n-tridecyl, n-tetradecyl, 12-methyltetradecyl, n-pentadecyl, n-hexadecyl, n-octadecyl, and eicosyl groups.

$R^{12}$ can also be an aryl group (e.g., phenyl, biphenyl, or naphthyl groups); an alkaryl group (4-decylphenyl, 2-methyl-1-naphthyl, o-tolyl, etc.); or an aralkyl group (benzyl, 12-phenyldodecyl, 1-naphthylmethyl, 2-(2-biphenyl)ethyl, etc.). These groups are also preferred.

Specifically, where trimethylsilylmethylmetal, $$(CH_3)_3SiCH_2M$$

is reacted with octanal, $C_8C_{16}O$, and then hydrolyzed, 2-(hydroxynonyl)trimethylsilane, $$(CH_3)_3SiCH_2CH(OH)C_7H_{15}$$

is obtained according to the following

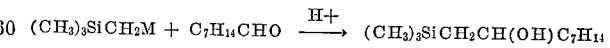

The above product, as well as the class of compounds where $R^1$ ranges from 1 to about 20 carbon atoms and $R^{12}$ ranges from 1 to about 12 carbon atoms, of this reaction finds utility in aqueous solution as a foam suppressor, for example, to lower the sudsing level of an anionic surfactant in a laundry composition or in a hard surface cleaning and polishing composition.

Reaction with ketones

The trialkylsilylmethylmetal compounds of this invention react readily with ketones having the formula:

wherein $R^{14}$ and $R^{15}$ are saturated or unsaturated groups, which may be the same or different, which are alkyl, aryl, alkaryl, or aralkyl groups containing from 1 to about 20 carbon atoms. The reaction proceeds as follows:

$$R^{14}\overset{O}{\underset{\|}{C}}R^{15} + (R_1R_2R_3)SiCH_2M \longrightarrow (R^1R^2R^3)SiCH_2\overset{OM}{\underset{|}{C}}(R^{14})(R^{15})$$

The resulting alkoxide salt can be reacted with water to obtain the β-hydroxysilane compounds according to the following $$(R^1R^2R^3)SiCH_2\overset{OM}{\underset{|}{C}}(R^{14})(R^{15}) + H_2O \longrightarrow$$

$$(R^1R^2R^3)SiCH_2\overset{OH}{\underset{|}{C}}(R^{14})(R^{15}) + MOH$$

The alkoxide salt can also be reacted with a conventional organic halide or pseudo-halide, $R^{11}X^2$, as hereinbefore described according to the following equation $$(R^1R^2R^3)SiCH_2\overset{OM}{\underset{|}{C}}(R^{14})(R^{15}) + R^{11}X^2 \longrightarrow$$

$$(R^1R^2R^3)SiCH_2\overset{OR^{11}}{\underset{|}{C}}(R^{14})(R^{15}) + MX$$

$R^{14}$ and $R^{15}$ are preferably alkyl groups, either saturated or unsaturated, containing from 1 to about 20 carbon atoms. Examples of these groups are: methyl, ethyl, propyl, isopropyl, n-butyl, n-pentyl, n-hexyl, n-octyl, n-nonyl, tripropylene, n-undecyl, n-decyl, tetrapropylene, n-dodecyl, n-tridecyl, n-tetradecyl, 4,6,8-trimethyltetradecyl, n-pentadecyl, n-hexadecyl, n-octadecyl and eicosyl groups.

$R^{14}$ and $R^{15}$ can also be aryl groups (e.g., phenyl, biphenyl, or naphthyl groups); an alkaryl group (4-decylphenyl, 2-methyl-1-naphthyl, o-tolyl, etc.) or an aralkyl group (benzyl, 12-phenyldodecyl, 1-naphthylmethyl, 2-(2-biphenyl)ethyl, etc.) These groups are also preferred.

Specifically when trimethylsilylmethylmetal, $$(CH_3)_3SiCH_2M$$

is reacted with acetone, $$CH_3\overset{O}{\underset{\|}{C}}CH_3$$

2-hydroxy-2-methylpropyltrimethylsilane, $$(CH_3)_3SiCH_2C(OH)(CH_3)_2$$

is formed. According to the following equation $$(CH_3)_3SiCH_2M + CH_3\overset{O}{\underset{\|}{C}}CH_3 \longrightarrow$$

$$(CH_3)_3SiCH_2C(OM)(CH_3)_2 \xrightarrow{H^+} (CH_3)_3SiCH_2\overset{CH_3}{\underset{\underset{CH_3}{|}}{C}}-OH$$

The product of the above reaction is useful as a perfume ingredient since it has a camphor-like odor and as a result can be used as an ingredient in the perfume in a bar soap. In addition, where $R^1$ ranges from 1 to 20 carbon atoms and the sum of $R^{14}$ and $R^{15}$ ranges from 2 to 20 carbon atoms, the class is useful as a foam suppressor for anionic surfactants in laundry detergent compositions.

Reaction with phosphites

The trialkylsilylmethylmetal compounds of this invention react with trialkyl or triaryl phosphites according to the following equation:

$$(R^{13}O)_3P + 3(R^1R^2R^3)SiCH_2M \longrightarrow$$
$$[(R^1R^2R^3)SiCH_2]_3P + 3R^{13}OM$$

wherein each $R^{13}$ in the above equation is an alkyl, aryl, alkaryl or aralkyl group containing from 1 to about 20 carbon atoms, there being no more than about 40 carbon atoms in the compounds $(R^{13}O)_3P$ and $$[(R^1R^2R^3)SiCH_2]_3P$$

The silylphosphine compounds can be oxidized as follows:

$$[(R^1R^2R^3)SiCH_2]_3P + [O] \rightarrow [(R^1R^2R^3)SiCH_2]_3P=O$$

and the resulting phosphine oxides are complexing agents for various metals and organometalloidal compounds. Mild oxidizing agents such as hydrogen peroxide can be used to oxidize the phosphines to the corresponding phosphine oxides. Where either $R^1$, $R^2$, or $R^3$ has a chain length from 10 to 22 carbon atoms, the above phosphine oxides can be used as a softening agent for textiles as a part of the finishing process.

The corresponding reaction wherein elemental sulfur replaces the oxygen in the above reaction results in the corresponding phosphine sulfides as follows:

$$[(R^1R^2R^3)SiCH_2]_3P + [S] \rightarrow [(R^1R^2R^3)SiCH_2]_3P=S$$

$R^{13}$ in the above formula for the phosphine reactant can be methyl, ethyl, isopropyl, n-butyl, isobutyl, n-decyl, n-dodecyl, n-hexadecyl, eicosyl, phenyl, benzyl, 4-dodecylphenyl, etc. The preferred $R^{13}$ group is phenyl.

Specifically when trimethylsilylmethylmetal, $$(CH_3)_3SiCH_2M$$

is reacted with triphenyl phosphite, $(C_6H_5O)_3P$, and the product, $[(CH_3)_3SiCH_2]_3P$, is reacted with elemental sulfur, tris(trimethylsilylmethyl)phosphine sulfide is formed according to the following $$(CH_3)_3SiCH_2M + (C_6H_5O)_3P \longrightarrow [(CH_3)_3SiCH_2]_3P \xrightarrow{[S]}$$
$$[(CH_3)_3SiCH_2]_3P=S$$

The phosphine sulfides are useful as oil additives when the oil is to be used in extreme pressure applications since the compound breaks down forming a protective monolayer on the metal parts.

Reaction with alkyl or aryl halo and pseudo-halo phosphines

The trialkylsilylmethylmetal compounds of this invention react readily with trihalophosphines, haloalkylphosphines, and haloarylphosphines according to the following equation:

$$(R^{16})_nPX^3_{3-n} + (3-n)(R^1R^2R^3)SiCH_2M \longrightarrow$$
$$(R^{16})_nP[CH_2Si(R^1R^2R^3)]_{3-n} + (3-n)MX$$

wherein each $R^{16}$ in the above equation is an alkyl, aryl, aralkyl, or alkaryl group containing 1 to about 20 carbon atoms, wherein $X^3$ is a halogen atom, e.g., chlorine, bromine, or iodine or a pseudo-halogen group such as $RO-$, and $R_2N-$, wherein R is selected from the group consisting of alkyl, aryl, alkaryl and aralkyl groups containing from 1 to about 20 carbon atoms, and wherein n is either 0, 1 or 2. These compounds will undergo several reactions. For example, the compounds can be oxidized as described hereinbefore to the following compounds:

$$(R^{16})_n\overset{O}{\underset{\|}{P}}[CH_2Si(R^1R^2R^3)]_{3-n}$$

$R^{16}$ in the above formulas and equations is preferably either a phenyl group or an alkyl chain containing from 1 to about 20 carbon atoms. Examples of these groups are: methyl, ethyl, propyl, isopropyl, butyl, n-hexyl, n-octyl, n-decyl, tetrapropylene, n-dodecyl, n-tridecyl, n-tetradecyl, n-hexadecyl, n-octadecyl, and eicosyl groups.

$R^{16}$ can be an aryl group (e.g., phenyl, biphenyl, or naphthyl groups); an alkaryl group (4-decylphenyl, 4-methyl-1-naphthyl, ethyldiphenyl, 2-methylphenyl, etc.); or an aralkyl group (benzyl, 12-phenyldodecyl, 1-naphthylmethyl, 2-(4-biphenyl)-ethyl, etc.). These groups are also preferred.

The preferred $X^3$ is chlorine.

The compounds which contain phosphine oxide moieties are surface active agents useful for forming oil-in-water emulsions when one of the $R^{16}$ groups contains about 8 to about 24 carbon atoms and the other $R^{16}$ groups are short alkyl groups, e.g., in hand creams or other cosmetic applications. Specifically, when dodecyldimethylsilylmethylmetal, $C_{12}H_{25}(CH_3)_2SiCH_2M$, is reacted with dimethylchlorophosphine, $(CH_3)_2PCl$, (dodecyldimethylsilylmethyl)dimethylphosphine, $$C_{12}H_{25}(CH_3)_2SiCH_2P(CH_3)_2$$

is obtained. This adduct can be subsequently oxidized with hydrogen peroxide to the corresponding phosphine oxide (dodecyldimethylsilylmethyl)dimethylphosphine oxide, according to the following $$C_{12}H_{25}(CH_3)_2SiCH_2M + (CH_3)_2PCl \longrightarrow$$
$$C_{12}H_{25}(CH_3)_2SiCH_2P(CH_3)_2$$
$$\downarrow H_2O_2$$
$$C_{12}H_{25}(CH_3)_2SiCH_2\overset{O}{\underset{\|}{P}}(CH_3)_2$$

The final product of the above reaction finds utility as a surfactant which can be used in combination with inorganic builders in a granular detergent composition.

In addition, all of these phosphine oxide-silicon compounds are lubricant additives as discussed hereinbefore. When there are two long alkyl groups of from 12 to 24 carbon atoms in these compounds, they are textile softeners for cotton fabrics.

All of the above compounds which contain phosphine groups can be converted to phosphonium compounds with a conventional organic halide or pseudo-halide, $R^{11}X^2$, as hereinbefore described according to the following equation:

$$(R^{16})_nP[CH_2Si(R^1R^2R^3)]_{3-n}+R^{11}X^2 \rightarrow$$
$$(R^{16})_n(R^{11})P[CH_2Si(R^1R^2R^3)]_{3-n}X^2$$

When these phosphonium compounds contain one long alkyl chain of from 8 to about 24 carbon atoms they are effective surface active agents and can be used in combination with inorganic builders in a laundry detergent composition. When the compounds contain two long alkyl chains of from 16 to about 24 carbon atoms these compounds are substantive textile softeners for cotton fabrics.

Reaction with halo or pseudo-halo alkyl and aryl silanes

The trialkylsilylmethylmetal compounds can be reacted with halo or pseudo-halo alkyl and aryl silanes according to the following $$(R^{17})_mSiX^4_{4-m} + (4-m)(R^1R^2R^3)SiCH_2M \longrightarrow$$
$$(R^{17})_mSi[CH_2Si(R^1R^2R^3)]_{4-m} + (4-m)MX^4$$

wherein $R^{17}$ is an alkyl, aryl, alkaryl, or aralkyl group containing from 1 to about 20 carbon atoms, wherein $X^4$ is a chlorine, bromine or iodine atom or a pseudo-halide such as an alkyl sulfate group ($RSO_4$—), an alkoxy group (RO—), or tertiary amino group ($R_2N$—), wherein R is as hereinbefore defined, and wherein $m$ is an integer from 1 to 3.

Preferred $R^{17}$ groups are a phenyl group and alkyl groups containing from 1 to about 20 carbon atoms, e.g., methyl, ethyl, propyl, allyl, butyl, n-pentyl, n-octyl, n-decyl, n-dodecyl, n-tridecyl, n-tetradecyl, n-pentadecyl, n-octadecyl, and eicosyl groups.

$R^{17}$ can be an aryl group (e.g., phenyl, biphenyl, or naphthyl groups); an alkaryl group (4-decylphenyl, 4-methyl-1-naphthyl, ethyldiphenyl, 2-methylphenyl, etc.); or an aralkyl group (benzyl, 12-phenyldodecyl, 1-naphthyldodecyl, 1 - naphthylmethyl, 2 - (4-biphenyl)-ethyl, etc.). These groups are also preferred.

Specifically when chlorotrimethylsilane, $(CH_3)_3SiCl$, is reacted with trimethylsilylmethylmetal, $(CH_3)_3SiCH_2M$, bis-(trimethylsilyl)methane, $[(CH_3)_3Si_2CH_2$, is obtained according to the following:

$$(CH_3)_3SiCl + (CH_3)_3SiCH_2M \rightarrow$$
$$(CH_3)_3SiCH_2Si(CH_3)_3 + MCl$$

The above product and the disilanes as a class find utility as intermediates to form trimethylvinylsilane which because of the presence of the vinyl group are useful monomers. These monomers can be homopolymerized, or copolymerized with styrene, to a molecular weight of about 1000 and used as hydraulic fluids in high temperature applications where high silicon content is desired.

Reaction with carbon dioxide

The trialkylsilylmethylmetal compounds of this invention will react with carbon dioxide according to the following equation:

$$(R^1R^2R^3)SiCH_2M + CO_2 \rightarrow (R^1R^2R^3)SiCH_2COOM$$

The resulting compounds are salts of trialkylsilylacetic acids with $R^1$, $R^2$, and $R^3$ as hereinbefore described. When $R^1$ is an alkyl chain containing from about 8 to about 20 carbon atoms and $R^2$ and $R^3$ are short chain alkyl groups, these salts of trialkylsilylacetic acids are useful for emulsifying fats and oils, e.g., in cake or bread batter preparations, useful as additives for motor oil providing the oil with detergency properties, e.g., to clean the internal portions, and useful as a gelling agent in the making of greases.

Specifically when n - decyldimethylsilylmethylmetal, $C_{10}H_{21}(CH_3)_2SiCH_2M$, is reacted with carbon dioxide, n-decyldimethylsilylacetate is obtained according to the following:

$$C_{10}H_{21}(CH_3)_2SiCH_2M + CO_2 \rightarrow$$
$$C_{10}H_{21}(CH_3)_2SiCH_2COOM.$$

The above product is useful as the cleaning agent in a bar soap composition.

Reaction with sulfur

The trialkylsilylmethylmetal compounds of this invention react with sulfur according to the following equation:

$$(R^1R^2R^3)SiCH_2M \xrightarrow{S_8} (R^1R^2R^3)SiCH_2SM$$

The products of this reaction, which are alkali metal trialkylsilylmethyl mercaptides, can be reacted with alkyl halides, $R^{11}X^2$, as described hereinbefore, to give silicon substituted organosulfides having the formula, $$(R^1R^2R^3)SiCH_2SR^{11}.$$

These silicon-containing sulfide compounds can be oxidized to give the corresponding sulfoxides, which when one of the $R^1$, $R^2$ or $R^3$ groups contains from about 8 to 20 carbon atoms are known surface active agents and can be used in hard surface cleaners.

Specifically, when trimethylsilylmethylmetal, $$(CH_3)_3SiCH_2M,$$

is reacted with sulfur, $S_8$, trimethylsilylmethylmetal mercaptide, $(CH_3)_3SiCH_2SM$, is obtained. This can be reacted subsequently with methyl iodide to obtain (trimethylsilylmethyl)dimethylsulfonium iodide according to the following:

$$(CH_3)_3SiCH_2M \xrightarrow{S_8} (CH_3)_3SiCH_2SM \xrightarrow{CH_3I}$$
$$[(CH_3)_3SiCH_2S(CH_3)_2]^+I^-$$

The sulfonium compounds are useful as antimicrobial agents, as for example in a liquid disinfectant.

All parts, percentages and ratios herein are by weight unless otherwise specified. The following examples are illustrative of the invention and should not be taken as limiting the scope of the claims.

EXAMPLE I

Preparation of trimethylsilylmethyllithium 5.8 gm. (0.05 mole) of N,N,N',N'-tetramethylethylenediamine (TMEDA) was added to 36 ml. of 1.4 molar (0.05 mole) n-butyllithium in hexane to form 0.05 mole of the n-butyllithium. TMEDA complex. (The temperature of the reaction was held below about 20° C. by means of an ice-water bath.) 4.4 g. (0.05 mole) of tetramethylsilane was added to the complex. The reaction mixture was stirred for three days at room temperature. The resulting reaction mixture contained the trimethylsilylmethyl-lithium (TMSML) and was analyzed by $H^1$ n.m.r. spectroscopy. The presence of trimethylsilylmethyl-lithium was established by signals centered at $\tau 9.6$ (singlet, methyl) and $\tau 11.8$ (singlet, methylene) in the correct area ratio. A complex absorption pattern was present at $\tau 7.45$–$7.95$ owing in part to the TMEDA protons. TMSML was used in the reactions to follow and all reactions herein (including Examples II–XII) described were carried out in an inert atmosphere of argon or nitrogen.

EXAMPLE II

Preparation of n-butyldimethylsilylmethyllithium 5.8 gm. (0.05 mole) of TMEDA was added to 36 ml. of 1.4 molar n-butyllithium (0.05 mole) in hexane to obtain 0.05 mole of the n-butyllithium TMEDA complex. 6.5 g. (0.05 mole) of n-butyltrimethylsilane was added and stirred for four days at room temperature. The reaction mixture was analyzed by treatment with $D_2O$ and the analysis of the deuterated silane formed, $n\text{-}C_4H_9(CH_3)_2SiCH_2D$, showed: 57.1% $d_0$, 42.6% $d_1$, and 0.3% $d_2$.

When in Examples I and II above other trialkylmethylsilanes are substituted on a molar basis for tetramethylsilane and n-butyltrimethylsilane, respectively, substantially equivalent results are obtained in that the corresponding trialkylsilylmethyllithium compounds are prepared. Such alkyls in the trialkylmethylsilanes include methyl, ethyl, n-propyl, isopropyl, n-pentyl, isopentyl, n-hexyl, 2,2-dimethylpentyl, n-heptyl, n-octyl, 2,2-dimethylhexyl, isooctyl, 2-ethylhexyl, n-nonyl, n-decyl, tripropylene, n-undecyl, n-dodecyl, tetrapropylene, n-tridecyl, n-tetradecyl, pentadecyl, n-hexadecyl, n-octadecyl, eicosyl, cyclopentyl, cyclohexyl, cyclohexylmethyl, methylcyclohexyl, 2-cyclohexyldodecyl, 12-cyclohexyldodecyl, 4-dodecylcyclohexyl, cyclooctyl, 4-methyldecyl, 4-ethyloctyl, 4-isopropyldecyl, and 3-methyldecyl silanes.

When in Examples I and II above, each of the following metalating agents are substituted on a molar basis for n-butyllithium·TMEDA complex substantially equivalent results are obtained in that the trialkylsilylmethylmetal compounds are prepared: methyl, ethyl, propyl, n-butyl, n-pentyl, n-octyl, n-decyl, tetrapropylene, n-hexadecyl, n-dodecyl, n-octadecyl, and eicosyl sodiums and potassiums; the complexes of methyl, ethyl, propyl, n-pentyl, n-octyl, n-decyl, tetrapropylene, n-hexadecyl, n-dodecyl, n-octadecyl and eicosyl lithiums with N-methyl, N-ethyl, N'-propyl, N'-butylpropylenediamine, N-dodecyl, N,N',N'-trimethylmethylenediamine, N-octyl, N,N',N' - triethylbutylenediamine, N,N,N',N' - tetraethylpropylenediamine, or N-eicosyl, N,N',N'-trimethylethylenediamine. Substantially equivalent results are also obtained when an excess of metalating agent to TMEDA is present, e.g., 2:1, 3:1 and 4:1, as is obtained when the two reactants are present in equal molar amounts.

When in Examples I and II above the following saturated hydrocarbons are substituted, either wholly or in part (e.g., 1:1 mixtures), for the hexane, substantially equivalent results are obtained in that the trialkylsilylmethylmetal compounds are prepared: pentane, octane, isooctane, nonane, decane, isododecane, and cyclohexane.

EXAMPLE III

Reaction of chlorotrimethylsilane with trimethylsilylmethyllithium

Treatment of the reaction mixture from Example I containing TMSML with a slight excess of chlorotrimethylsilane (6 gm., 0.055 mole) dissolved in 20 ml. of tetrahydrofuran resulted in a 36% yield of bis(trimethylsilyl)methane, $[(CH_3)_3Si]_2CH_2$, B.P. 132–136°, $n_D^{20}$ 1.4150. An $H^1$ n.m.r. spectral analysis of the compound confirmed the structural assignment (two singlets separated by an internal chemical shift of 0.29 p.p.m. in the ratio of 9:1). The approximate chemical shifts of the methyl and methylene protons were $\tau 9.99$ and 10.28, respectively, to a $CHCl_3$ lock signal.

In addition to the bis(trimethylsilyl)methane, an 18% yield of N,N,N'-trimethyl - N' - [trimethylsilylmethyl] ethylene diamine,

B.P. 188–192°, was obtained.

EXAMPLE IV

Reaction of chlorotrimethylsilane with n-butyldimethylsilylmethyllithium

The reaction product containing n-butyldimethylsilylmethyllithium, $n\text{-}C_4H_9(CH_3)_2SiCH_2Li$, obtained and described in Example II, was treated with a slight excess of chlorotrimethylsilane (6 g., 0.055 mole) dissolved in 25 ml. of tetrahydrofuran to give the corresponding methylenedisilane, $n\text{-}C_4H_9(CH_3)_2SiCH_2Si(CH_3)_3$, B.P. 83° (18 mm. Hg), in 46% yield. Structure assignment of the above disilane was confirmed by $H_1$ n.m.r. spectroscopy with signals centered at $\tau$ 8.71 ($\beta,\gamma$-methylene), 9.14 (methyl), 9.48 ($\alpha$-methylene), 9.98 and 10.0 (silylmethyl), and 10.28 ($\equiv SiCH_2Si\equiv$) in the correct area ratios.

When in Examples III and IV above the following haloalkyl- or arylsilanes are substituted on a molar basis for the chlorotrimethylsilane substantially equivalent results are obtained in that the corresponding disilicon compounds are prepared: chloroheptyldimethylsilane, bromocyclohexyldodecylmethylsilane, iodophenyldecylbutylsilane, chlorotriphenylsilane, chlorobutylethylmethylsilane, chlorodipropylmethylsilane, chlorodihexylmethylsilane, bromobenzylethylallylsilane, chloroeicosylcyclohexyl(2,4 - hexadiynyl)silane, 4 - dimethylaminophenyl-3-(4-biphenyl)propyl-(3,6,9,12-tetraoxaoctadecyl) chlorosilane, chlorodiphenylmethylsilane, dimethylphenylchlorosilane, dodecoxynaphthyl(3 - diethylaminopropyl)- (2,4 - dodecadiynyl)dichlorosilane and (diethylamino) tribromosilane.

EXAMPLE V

Reaction of octanal with trimethylsilylmethyllithium

TMSML as prepared in Example I was reacted with an equal equal molar amount of octanal, $n\text{-}C_7H_{15}CHO$ (6.4 g., 0.05 mole) in 25 ml. of tetrahydrofuran. The mixture was stirred for 2 hours and, ($\beta$-hydroxynonyl)trimethylsilane, B.P. 82–83° (1 mm. Hg), $n_D^{25}$ 1.4400, was obtained in 32% yield.

When in the above example the following aldehydes are substituted on a molar basis for the octanal, substantially equivalent results are obtained in that the corresponding $\beta$-hydroxyalkyltrimethylsilanes are prepared: formaldehyde, acetaldehyde, lauraldehyde, naphthaldehyde, 2-methoxybenzaldehyde, 3,6,9,12 - tetraoxaoctadecaldehyde, 3-diethylaminopropaldehyde, 8-tetradecenaldehyde, 2-dodecynaldehyde and 2,4-dodecadiynaldehyde.

EXAMPLE VI

Reaction of acetone with trimethylsilylmethyllithium 0.05 mole of TMSML as prepared in Example I was reacted for ½ hour at room temperature with 2.9 g. of acetone (0.05 mole) dissolved in 50 ml. of tetrahydrofuran. The reaction product was subsequently hydrolyzed with aqueous ammonium chloride to give ($\beta$-hydroxymethyl)propyltrimethylsilane, B.P. 55–57° (15 mm. Hg), $n_D^{25}$ 1.4980 in 25% yield.

When in the above example the following ketones are substituted on a molar basis for acetone, substantially equivalent results are obtained in that the corresponding β-hydroxyalkyltrimethylsilanes are prepared: butanone, 2-pentanone, 4-heptanone, 3-octanone, 5-decanone, 2,2-dimethyl-4-dodecanone, 6-hexadecanone and 10-eicosanone.

EXAMPLE VII

Reaction of undecyl bromide with trimethylsilylmethyllithium

When equal molar quantities of undecyl bromide, $C_{11}H_{23}Br$, (11.79 g., 0.05 mole) dissolved in 25 ml. of tetrahydrofuran and 0.05 mole of TMSML as obtained in Example I are stirred for 12 hours, the product, dodecyltrimethylsilane, $(CH_3)_3SiC_{12}H_{25}$, B.P. 273°, $n_D^{20}$ 1.4358 is obtained.

When in the above reaction the following alkyl and aryl halides are substituted on a molar basis for undecyl-bromide, substantially equivalent results are obtained in that the corresponding alkyl- and aryltrimethylsilanes are prepared, i.e., chlorides, bromides and iodides of the following alkyl and aryl groups: methyl, ethyl, n-propyl, isopropyl, n-pentyl, isopentyl, n-hexyl, 2,2-dimethylpentyl, n-heptyl, n-octyl, 2,2-dimethylhexyl, isooctyl, 2-ethylhexyl, n-nonyl, n-decyl, tripropylene, n-undecyl, n-dodecyl, tetrapropylene, n-tridecyl, n-tetradecyl, n-pentadecyl, n-hexadecyl, n-octadecyl, eicosyl, cyclopentyl, cyclohexyl, cyclohexylmethyl, methylcyclohexyl, 2-cyclohexyldodecyl, 12-cyclohexyldodecyl, 4-dodecylcyclohexyl, cyclooctyl, phenyl, biphenyl, naphthyl, 3-phenyldodecyl, 4-methyldecyl, 4-phenyloctyl, 4-propyldecyl, 4-phenylbutyl, 3-methyldecyl, 3-(1-naphthyl)propyl, 4-(1-naphthyl)butyl-3-ethyl-3-(4-biphenyl).

EXAMPLE VIII

Reaction of chlorodiphenylphosphine with trimethylsilylmethyllithium

The reaction mixture containing TMSML (0.05 mole) obtained as in Example I was added to 11 g. (0.05 mole) of chlorodiphenylphosphine dissolved in 50 ml. of tetrahydrofuran. The mixture was allowed to react for 2 hours. Subsequently the reaction mixture was carefully hydrolyzed with aqueous ammonium chloride and 8.2 g. (30% yield) of (trimethylsilylmethyl)diphenylphosphine, B.P. 139–143° (0.6 mm. Hg) was obtained. This compound gave rise to a $P^{31}$ n.m.r. signal at +22.5 p.p.m. (in chloroform) relative to 85% $H_3PO_4$.

When in the above example the following halo, halo alkyl or aryl phosphines are substituted on a molar basis for the chlorodiphenylphosphine, substantially equivalent results are obtained in that the corresponding (trimethylsilylmethyl)alkyl or aryl phosphines are prepared: phosphorus trichloride, phenylmethylchlorophosphine, diallylbromophosphine, dimethylchlorophosphine, dodecylmethylchlorophosphine, dimethyliodophosphine, dodecyldichlorophosphine, hexadecyldibromophosphine, (2-octadecynyl)-1-naphthylchlorophosphine, 4-biphenylisopropylchlorophosphine, 3,6,9,12-tetraoxaoctadecylmethylbromophosphine, 4-methoxyphenyldichlorophosphine and (3-diethylaminopropyl)-phenylchlorophosphine.

When in the above example any of the trialkylsilylmethyl alkali metals of Examples I and II are substituted for TMSML on a molar basis, substantially equivalent results are obtained in that the corresponding (trialkylsilylmethyl)alkyl or aryl phosphines are prepared.

EXAMPLE IX

Reaction of carbon dioxide with trimethylsilylmethyllithium

The reaction mixture was prepared in Example I containing the TMSML is poured onto excess crushed Dry Ice—ethyl ether slurry. After carbon dioxide evolution ceases, water is added and the two layers are separated. The neutral materials are present in the organic phase and the lithium carboxylates are present in the aqueous phase. The aqueous phase is acidified with dilute sulfuric acid to a pH of approximately 3 and then extracted with ether. Trimethylsilylacetic acid, M.P. 40° C. is obtained upon concentration of the ether extracts.

EXAMPLE X

Reaction of sulfur with trimethylsilylmethyllithium

The reaction mixture as prepared in Example I containing the TMSML solution (0.05 mole) is treated with an equivalent of sulfur (0.05 mole). This mixture is stirred for one hour at room temperature and then an access of methyl iodide is added to form (trimethylsilylmethyl)dimethylsulfonium iodide, M.P. 105–107°. Structure assignment of this derivative is confirmed by $H^1$ n.m.r. spectral analysis. Signals are centered at τ6.94 [$(CH_3)_2S^+$] and τ7.08 [$\equiv SiCH_2S\equiv$] (relative to the $(CH_3)_3Si$-group which was assigned as 0 p.p.m.) in the correct area ratios.

EXAMPLE XI

Reaction of ethylene oxide with trimethylsilylmethyllithium

The reaction mixture containing TMSML as prepared in Example I is reacted in equal molar amounts (0.05 mole) with ethylene oxide (0.05 mole) at room temperature by bubbling the ethylene oxide through the hexane solvent containing the TMSML.

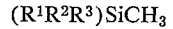

is obtained after acidification with aqueous ammonium chloride with literature values of B.P. 83° (27 mm. Hg) and $n_D^{20}$ 1.4290.

When in the above example other epoxides are substituted for ethylene oxide on an equal molar basis, substantially the same results are obtained with the γ-hydroxypropyltrialkylsilanes being obtained, e.g., propylene oxide, butylene oxide, pentalene oxide, octalene oxide, tetramethylethylene oxide, propylbutylethylene oxide, and diphenylethylene oxide.

EXAMPLE XII

Reaction of triphenylphosphite with trimethylsilylmethyllithium

Equal molar amounts (0.05 mole) of triphenylphosphite, $(C_6H_5O)_3P$, are reacted with TMSML as prepared in Example I. Upon purification, tris(trimethylsilylmethyl) phosphine, [$(CH_3)_3SiCH_2]_3P$, M.P. 66–70°, is obtained.

When in the above reaction other phosphites are used, substantially equivalent results are obtained, e.g., trimethylphosphite, tripropylphosphite, hexadecyldimethylphosphite, and hexyldiphenylphosphite.

What is claimed is:

1. The process of preparing trialkylsilylmethylmetal compounds comprising the step of reacting a trialkylmethylsilane having the formula

wherein $R^1$, $R^2$, and $R^3$ are each saturated alkyl groups containing from one to 20 carbon atoms, with a metalating agent selected from the group consisting of (1) alkylsodium, wherein the alkyl group contains from 1 to 20 carbon atoms and is attached to the sodium through a primary carbon atom, (2) alkylpotassium, wherein the alkyl group contains from 1 to 20 carbon atoms and is attached to the potassium through a primary carbon atom, and (3) a complex of an alkyllithium wherein said alkyl group contains from 1 to about 20 carbon atoms with a diamine compound selected from the group consisting of compounds having the formula $$(R^4R^5)NR^6N(R^7R^8)$$

wherein each $R^4$, $R^5$, $R^7$ and $R^8$ is a saturated alkyl group containing from 1 to about 20 carbon atoms and wherein $R^6$ is a saturated alkylene group containing from 1 to 4 carbon atoms and wherein the total number of carbon atoms in said diamine compound is from 5 to about 30 carbon atoms, said reaction taking place in an inert atmosphere at a temperature of from about −60° C. to about 100° C. and in a solvent which is either an excess of the trialkylmethylsilane or a saturated hydrocarbon containing from about 5 to about 16 carbon atoms.

2. The process of claim 1 wherein $R^1$, $R^2$ and $R^3$ are each alkyl groups containing from 1 to 20 carbon atoms and wherein said metalating agent is said complex of an alkyllithium with a diamine compound.

3. The process of claim 2 wherein $R^1$, $R^2$, and $R^3$ each are methyl groups, each $R^4$, $R^5$, $R^7$ and $R^8$ is selected from the group consisting of methyl groups and ethyl groups, $R^6$ is an ethylene group, and the alkyllithium is n-butyllithium.

References Cited
UNITED STATES PATENTS 2,964,550 12/1960 Seyferth _____ 260—448.2 X
3,293,275 12/1966 Pratt _____ 260—448.2
3,426,021 2/1969 Seyferth _____ 260—448.2 X

OTHER REFERENCES

Gilman et al., J.A.C.S. (1951), vol. 73, pp. 5878–9, 260–448.2.

TOBIAS E. LEVOW, Primary Examiner

W. F. W. BELLAMY, Assistant Examiner